June 19, 1934.  E. M. HAMMER  1,963,463
POLE HOLDER
Filed July 18, 1932  2 Sheets-Sheet 1
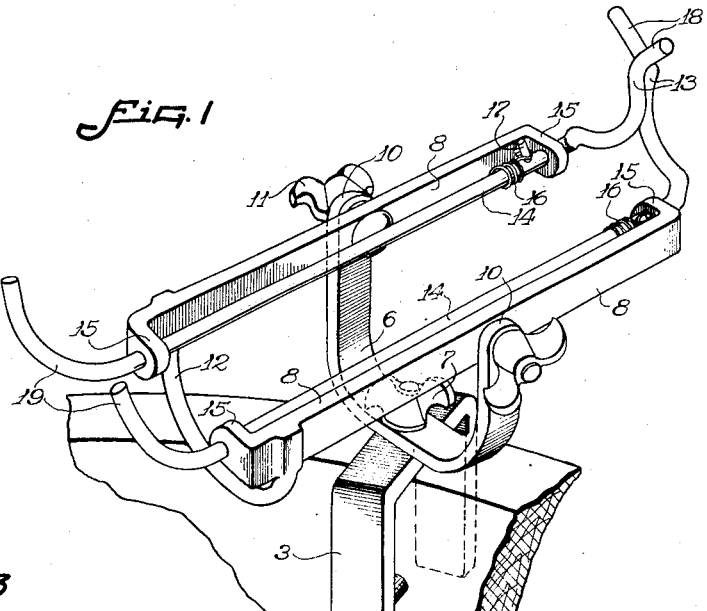
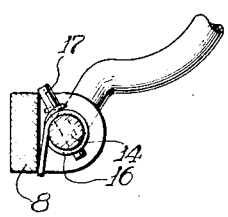
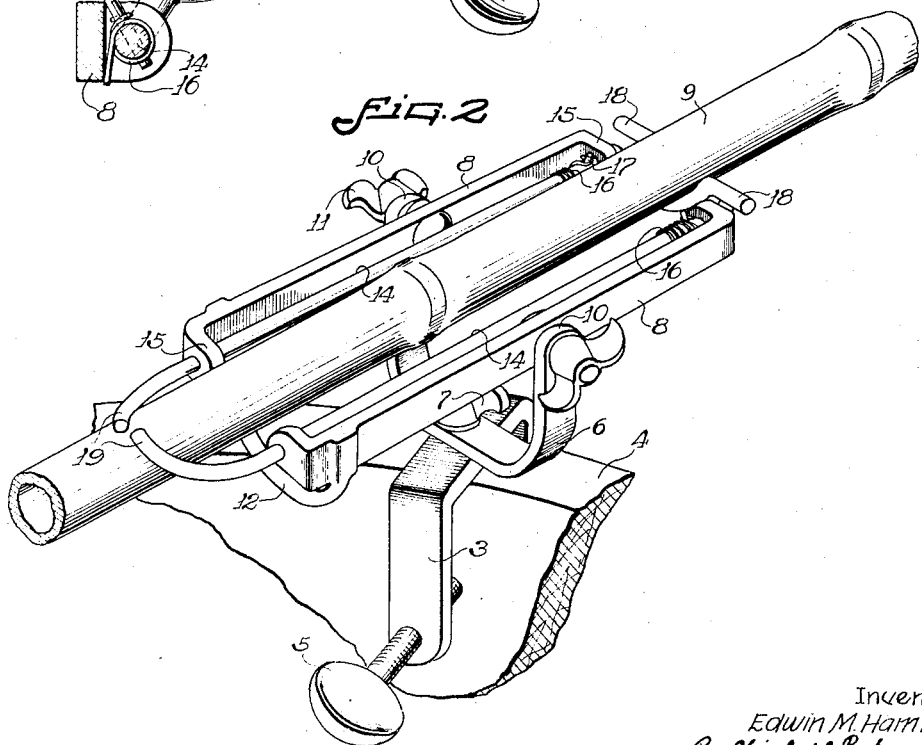
Inventor
Edwin M. Hammer
By Chindahl, Parker & Carlson
Attorneys June 19, 1934.   E. M. HAMMER   1,963,463
POLE HOLDER
Filed July 18, 1932   2 Sheets-Sheet 2

Inventor
Edwin M. Hammer
By Chindall, Parker & Coulson
Attorneys

Patented June 19, 1934

1,963,463

UNITED STATES PATENT OFFICE 1,963,463

POLE HOLDER

Edwin M. Hammer, Rockford, Ill.

Application July 18, 1932, Serial No. 623,060

15 Claims. (Cl. 248—37)

This invention relates to holders for poles and the like and more particularly to a holder especially adapted for supporting a fish pole in a substantially horizontal position.

The general object of the invention is to provide a holder for a fish pole or the like having a new and improved means acting automatically as an incident to placement of a pole in the holder to grip the pole and hold it firmly in a predetermined position and to release the pole when the latter is lifted from the holder.

A more detailed object is to provide a pole-supporting frame and two movable members mounted thereon, one underlying the pole placed in the holder and operable under the weight of the pole to move the other member to and maintain the same in a position overlying the pole whereby to prevent the pole from swinging about a point of support spaced from the overlying member.

The invention also resides in the manner of mounting the holder to obtain vertical and horizontal adjustment thereof.

Other objects and advantages of the invention will become apparent from the following detailed description taken in connection with the accompanying drawings, in which Figure 1 is a perspective view of a pole holder embodying the features of the present invention.

Fig. 2 is a similar view with the holder in use.

Fig. 3 is a fragmentary transverse sectional view.

Figure 4:
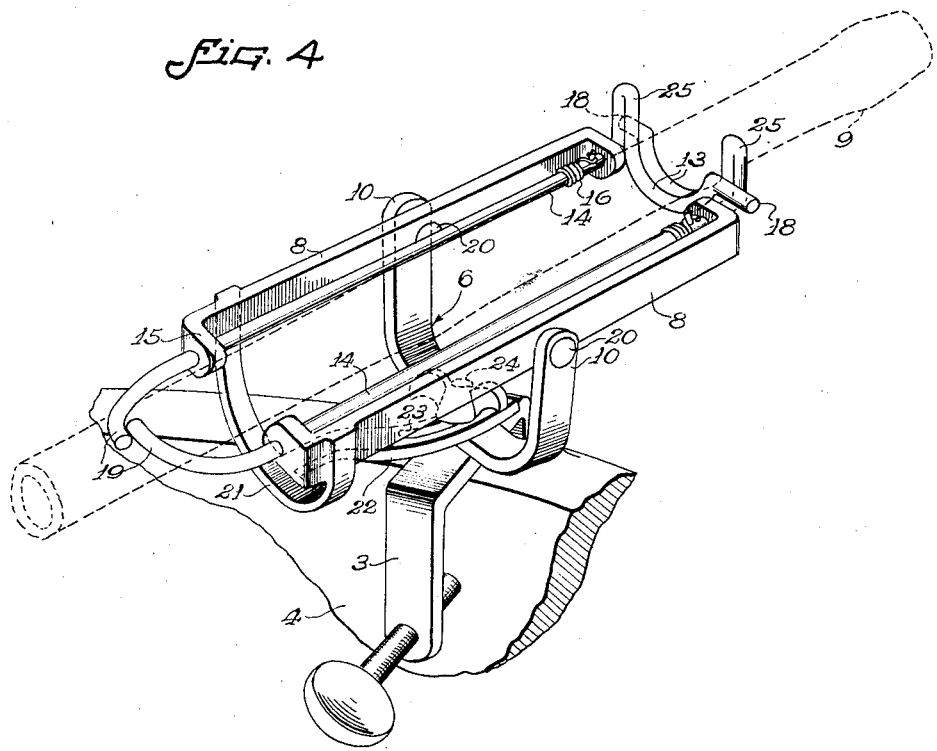
Fig. 4 is a view similar to Fig. 2 showing a modified form of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the holder is mounted for movement about horizontal and vertical axes by means including a suitable clamp 3 preferably of U-shaped form adapted to fit over the edge 4 of a boat and to be securely fastened thereto by tightening a screw 5. Pivoted on the clamp for movement about a vertical axis is a bracket in the form of a yoke 6 opening upwardly and adapted to be clamped in any desired angular position by a thumb nut 7. Herein the frame of the holder comprises two parallel bars 8 preferably spaced apart to receive the pole 9 between them and pivoted intermediate their ends on the upper ends of the yoke arms 10 and thereby adapted to be tilted into any desired angular position relative to the horizontal in which the bars are retained by clamping bolts 11.

The bars 8 are rigidly connected at one of their ends by a cross member 12 which maintains the bars in properly spaced relation and preferably is disposed below the bars.

At the other end of the bars 8 is a movable support which assumes an inactive position when the holder is not in use and which is moved automatically to active position under the weight of a pole placed in the holder. In the present instance, this support is in the form of two overlapping arms 13 each projecting at right angles to an elongated rod 14 extending through and journaled in inturned lugs 15 at the opposite ends of the bars 8. Springs 16 coiled about the rods 14 and acting between the bars 8 and lugs 17 on the rods tend to swing the arms 13 upwardly thereby maintaining the arms in the inactive position shown in Fig. 1, when the holder is not in use. In this position, which is determined by engagement of the lugs 17 and the bars 8, the substantially straight ends 18 of the arms intersect and define a V-shaped notch in which the pole may be placed conveniently.

Intermediate their ends, the arms 13 are bent to form a horizontal upwardly opening depression in which the pole becomes seated when placed in the holder. This position is determined by engagement of the end 18 of one of the arms with the rod 14 supporting the other arm.

Means actuated automatically by movement of the movable support above described is provided for engaging the upper side of the pole at a point spaced from the movable support thereby preventing the supported end of the pole from swinging about the movable support as a fulcrum under the weight of the opposite end which overhangs the holder. In the present instance, this means comprises a pair of arms 19 extending laterally from the rods 14 at the ends opposite the arms 13. The arms 19 are set relative to the arms 13 in positions such that when the holder is not in use and the arms 13 are positioned as shown in Fig. 1, the arms 19 will be spaced apart and thereby adapted to receive a pole between them. In the movement of the arms 13 into the position shown in Fig. 2, the arms 19 will be swung toward each other into active position overlying the pole as shown in Fig. 2.

When the holder above described is utilized for supporting a fish pole, the frame is generally set at a slight angle relative to the horizontal, the arms 19 being at the lower end of the frame. To support a pole in the holder thus positioned, the lower end of the pole is lowered sidewise in a vertical direction onto the holder so that the lower end portion of the pole enters between the upstanding arms 19 at the same time that a portion higher up on the pole enters the notch formed by the ends 18 on the arms 13. During the further lowering of the pole, the arms 13 are spread apart under the weight of the pole and swung downwardly until they reach the limit position shown in Fig. 2. In such movement, the arms 19 are swung toward each other against the action of the springs 16 and are brought into the position shown in Fig. 2 wherein both of the arms overlie the pole.

With the pole thus positioned, it will be apparent that the major portion of the pole overhangs the holder beyond the upper end thereof. The pole thus tends to fulcrum about the support provided by the arms 13 thereby causing an upward pressure to be exerted on the arms 19, but the latter are held firmly in the overlying position owing to the fact that these arms can move upwardly only by upward movement of the arms 13 which are held firmly in place by the weight of the pole and the pull that may be exerted thereon by the fish line. Since the pole is disposed in a depression formed by the arms 13 and between the lugs 15 at the lower end of the frame, the pole is held effectually against lateral movement by any pull that might be exerted on the end of the pole by the fish line. Ordinarily such pull is in a downward direction and the greater this pull the more firmly the pole will be held on its support.

Removal of the pole from the holder is accomplished simply by lifting the pole off from the frame. This movement releases the arms 13 for upward movement and permits the arms 19 to be swung apart thereby permitting withdrawal of the pole by sidewise movement thereof in an upward direction.

From the foregoing it will be apparent that the holder above described is of simple construction and is convenient to operate because the movement of the arms 19 into and out of locking positions above the pole is effected automatically as an incident to the normal operations of placing a pole upon and lifting it from a support. The holder is adapted for use with any kind, length or diameter of pole commonly used in fishing and may be adjusted conveniently to any desired angular position.

Fig. 4 shows a modified form of the invention illustrating a simplified and more rugged adjustable mounting. In this form, the arms 10 of the yoke 6 are pivoted to the frame bars 8 by rivets 20 and the rear ends of the bars are rigidly connected by a cross-piece 21. Projecting downwardly and forwardly from the cross-piece is a curved brace member 22 having a slot 23 at its lower end through which extends a bolt 24 by which the yoke 6 and the clamp 3 are secured together in adjusted relation. The slotted portion of the brace 22 is curved on a radius equal to the spacing of the rivets 20 and the cross-piece 21 thereby permitting the frame to be tilted vertically to any desired angle when the clamping bolt is loosened. A single bolt thus clamps the frame in adjusted position about its horizontal and vertical axes and the brace 22 effectually maintains such position. If desired, a deeper notch for supporting the pole may be provided by forming the arms 13 with upstanding projections 25 at the remote ends of the depressions in the arms. In the form shown in Fig. 4, the arms 19 are offset slightly so as to overlap each other when a pole is supported in the holder.

I claim as my invention:

1. A pole holder comprising, in combination, a rectangularly shaped frame comprising a pair of elongated bars rigidly connected together and having inturned lugs at their opposite ends, means supporting said frame intermediate the ends of said bars for pivotal movement about horizontal and vertical axes, a pair of rods each extending alongside of one of said bars and journaled in opposite ends in the lugs on the bar, arms projecting laterally from the rods at one of their ends and intersecting each other so as to define an upwardly opening notch for receiving a pole, said arms being swingable downwardly into parallel relation and in this relation providing a depression in which the pole becomes seated and held against lateral movement, lateral arms at the opposite ends of said rods extending upwardly when said first mentioned arms are in intersecting relation to the pole and moved into positions overlying the pole in the movement of the first mentioned arms into said parallel relation, and springs acting on said rods and normally tending to turn the same in directions to maintain said first mentioned arms in said intersecting relation.

2. A pole holder comprising, in combination, a pair of spaced parallel bars rigidly connected together and supported in substantially horizontal positions, a pair of rods each rotatably supported at spaced points by said bars, an arm on one end of each of said rods extending laterally therefrom, spring means normally urging said rods angularly in opposite directions into predetermined positions in which said arms extend upwardly and intersect each other to form a notch, said arms being spread apart and moved downwardly by the weight of a pole placed in said notch, and lateral arms on the opposite ends of said rods normally adapted to receive a pole between them and moved into overlying relation to the pole in the downward movement of said first mentioned arms.

3. A pole holder comprising, in combination, a frame adapted to be supported in a substantially horizontal position, a pair of parallel rods rotatably supported at spaced points in said frame, an arm rigid with and extending laterally from one of said rods and formed intermediate its ends with a depression which opens upwardly when the arm is moved downwardly into a limit position, spring means acting normally to maintain said arm in an upwardly inclined limit position, an arm on the other of said rods lying adjacent and intersecting said first mentioned arm when the latter is in said latter position whereby to form a notch adapted to receive a pole to be supported by the holder, and a locking member arranged to be actuated by one of said rods and moved into overlying relation to said pole in the lowering of said first mentioned arm by the weight of a pole placed in said notch.

4. A pole holder comprising, in combination, an elongated frame member adapted to be supported in substantially horizontal position, a rod journaled at spaced points in said frame and normally urged into a limit position, a lateral arm on one end of said rod extending upwardly when said rod is in said limit position and adapted to be swung downwardly under the weight of a pole laid upon said frame, and means at the opposite end of said rod adapted in the downward movement of said arm to move into overlying relation to the pole placed on said frame.

5. A pole holder comprising, in combination, a frame, an arm pivotally mounted on said frame and adapted to be engaged and moved downwardly under the weight of a pole lowered onto said frame, and a second arm rigid with said first mentioned arm and arranged to be moved thereby into a position spaced from the first mentioned arm and overlying the pole placed on said frame.

6. A pole holder comprising, in combination, a frame upon which the pole to be supported may be laid, a member movably mounted on said frame and movable under the weight of the pole into a position underlying the latter, a second member mounted on said frame and spaced longitudinally of the pole from said first mentioned member, said second member being moved to a position overlying the pole in the movement of said first mentioned member under the weight of the pole, and spring means acting to withdraw said second member to inactive position when the pole is lifted from said frame.

7. A pole holder comprising, in combination, a supporting frame mounted for pivotal movement about horizontal and vertical axes and adapted to receive a pole lowered thereto sidewise in a vertical direction, two interconnected members engageable with the pole at spaced points along its length, one underlying the pole and movable in one direction under the weight of a pole placed on said frame, spring means for moving said last mentioned member in the opposite direction upon withdrawal of the pole, said last mentioned member operating upon movement in said first mentioned direction to move the other member into a position overlying the pole.

8. A pole holder comprising, in combination, an elongated frame adapted when in substantially horizontal position to receive a pole to be supported, a yoke having upwardly extending arms pivotally connected to said frame to permit swiveling of the frame about a substantially horizontal axis, a support, a clamping bolt seated in said support and extending through the center of the yoke to permit swiveling of the latter about a substantially vertical axis, a brace fastened at one end to said frame at a point spaced from said first mentioned axis, the other end of said brace extending transversely of said yoke and having a slot therein receiving said bolt whereby the latter also serves to clamp said brace in fixed position.

9. A pole holder comprising, in combination, a frame for receiving a pole in substantially horizontal position, a support, a member pivotally connected to said support and frame to support the latter and permit independent adjustment thereof about substantially horizontal and vertical axes, a brace rigidly connected at one end to said frame with the other end lying adjacent said member and extending transversely of one of said axes, and a single device for clamping said member and brace together in adjusted position and also to hold said frame in adjusted positions about both of said axes.

10. A pole holder comprising, in combination, a frame for receiving a pole in substantially horizontal position, a support, a member pivotally connected to said support and frame to support the latter and permit independent adjustment thereof about substantially horizontal and vertical axes, and a single bolt defining one of said axes and operable to clamp said frame in adjusted positions about both of said axes.

11. A pole holder, comprising, in combination, a frame adapted to receive a pole to be supported, means supporting said frame for adjustment about substantially perpendicular axes, an elongated member for bracing said frame against swiveling about one of said axes, said element being adjustably secured at one of its ends and curved to permit swiveling of the frame about the latter axis for purposes of adjustment.

12. A pole holder comprising, in combination, an elongated frame adapted to receive a pole laid thereon in substantially horizontal position, a member mounted on said frame to turn about an axis extending parallel to but spaced laterally from said pole and having an arm movable into and out of overlying relation to said pole, and means positioned to be engaged and depressed by said pole when lowered onto said frame and operable to actuate said member and move said arm over the pole.

13. A pole holder comprising, in combination, a frame supported to receive a pole in substantially horizontal position, a part mounted on said frame and movable into a position overlying a pole placed on the frame, a member for actuating said part pivotally mounted on said frame to turn about an axis extending parallel to and spaced laterally from the pole and including an arm spaced along the pole from said part and adapted to be engaged and depressed by the pole when lowered onto said frame.

14. A pole holder comprising, in combination, a frame supported to receive a pole in substantially horizontal position, a part mounted on said frame and movable into a position overlying a pole placed on the frame, a member for actuating said part pivotally mounted on said frame and including an arm spaced along said pole from said part and adapted to be engaged and depressed by the pole when lowered onto said frame, spring means acting between said frame and said member and tending to swing the latter in a direction to move said arm upwardly, and means on said member engageable with said frame to interrupt the upward movement of the arm when the latter reaches a predetermined inclined position.

15. A pole holder comprising, in combination, an elongated frame member adapted to be supported in substantial horizontal position and to receive a pole laid thereon, an arm pivotally mounted on said frame and adapted to be engaged and depressed into a substantially horizontal position by a pole laid upon the frame, a second arm rigid with said first mentioned arm adjacent the pivot thereof and movable therewith into a substantially vertical position in the movement of the first arm into horizontal position, said second arm serving to prevent lateral movement of the pole in one direction along the first arm.

EDWIN M. HAMMER.